United States Patent
Shariat

(10) Patent No.: US 12,108,277 B2
(45) Date of Patent: *Oct. 1, 2024

(54) METHOD AND APPARATUS FOR QUALITY OF SERVICE HANDLING IN WIRELESS COMMUNICATION SYSTEM

(71) Applicant: Samsung Electronics Co., Ltd., Suwon-si (KR)

(72) Inventor: Mehrdad Shariat, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/312,216

(22) Filed: May 4, 2023

(65) Prior Publication Data
US 2023/0276295 A1    Aug. 31, 2023

Related U.S. Application Data

(63) Continuation of application No. 17/323,401, filed on May 18, 2021, now Pat. No. 11,647,416.

(30) Foreign Application Priority Data

May 19, 2020 (GB) ..................................... 2007435
May 10, 2021 (GB) ..................................... 2106639

(51) Int. Cl.
*H04W 28/02* (2009.01)
*H04W 28/24* (2009.01)
(Continued)

(52) U.S. Cl.
CPC ... *H04W 28/0268* (2013.01); *H04W 28/0263* (2013.01); *H04W 28/24* (2013.01); *H04W 80/02* (2013.01); *H04W 92/18* (2013.01)

(58) Field of Classification Search
CPC ......... H04W 28/0268; H04W 28/0263; H04W 28/24; H04W 80/02; H04W 92/18; H04W 88/04; H04W 76/23; H04W 4/40
See application file for complete search history.

(56) References Cited

U.S. PATENT DOCUMENTS

| | | | |
|---|---|---|---|
| 11,647,416 B2 * | 5/2023 | Shariat ................ | H04W 76/23 370/229 |
| 2010/0022184 A1 * | 1/2010 | Khoshnevis .......... | H04L 1/1607 455/7 |

(Continued)

FOREIGN PATENT DOCUMENTS

| | | | |
|---|---|---|---|
| EP | 3 328 124 A1 | 5/2018 | |
| EP | 3 900 279 A1 | 10/2021 | |

(Continued)

OTHER PUBLICATIONS

LG Electronics, Updates to Solution#6, S2-2000349, SA WG2 Meeting #136AH, Jan. 7, 2020, Incheon, Korea.

(Continued)

*Primary Examiner* — Afshawn M Towfighi
(74) *Attorney, Agent, or Firm* — Jefferson IP Law, LLP

(57) ABSTRACT

A method performed by a user equipment (UE)-to-network relay in a wireless communication system is provided. The method includes, in case that PC5 quality of service (QoS) flows setup is initiated by a remote UE, identifying whether QoS requirements associated with the remote UE and the UE-to-network relay are supported, in case that the QoS requirements are not supported, identifying one or more QoS parameters that satisfy the QoS requirements, and based on the one or more QoS parameters, updating a PC5 QoS flow.

8 Claims, 6 Drawing Sheets

(51) Int. Cl.
*H04W 80/02* (2009.01)
*H04W 92/18* (2009.01)

(56) References Cited

U.S. PATENT DOCUMENTS

| | | |
|---|---|---|
| 2017/0288886 A1 | 10/2017 | Atarius et al. |
| 2018/0279319 A1 | 9/2018 | Yu et al. |
| 2019/0124651 A1* | 4/2019 | Xu ................. H04W 76/20 |
| 2019/0281491 A1 | 9/2019 | Cheng et al. |
| 2020/0205209 A1* | 6/2020 | Pan ................. H04W 72/51 |
| 2020/0314960 A1* | 10/2020 | Basu Mallick ....... H04W 76/27 |
| 2020/0413467 A1* | 12/2020 | Pan ................. H04W 72/04 |
| 2021/0289391 A1* | 9/2021 | Paladugu ............ H04L 47/2491 |
| 2021/0410002 A1* | 12/2021 | Shariat ............. H04W 28/0268 |

FOREIGN PATENT DOCUMENTS

| | | |
|---|---|---|
| WO | 2017/026760 A1 | 2/2017 |
| WO | 2018/085568 A1 | 5/2018 |
| WO | 2018/129543 A1 | 7/2018 |
| WO | 2020/060332 A1 | 3/2020 |
| WO | 2020/088815 A1 | 5/2020 |
| WO | 2020/102621 A1 | 5/2020 |
| WO | 2020/124381 A1 | 6/2020 |
| WO | 2021/183907 A1 | 9/2021 |
| WO | 2021/183920 A1 | 9/2021 |

OTHER PUBLICATIONS

OPPO, QoS handling for Layer-3 UE-to-Network Relay, pre-SA2#139E_CC_FS_5G_ProSe, 3GPP SA WG2 Meeting #139E, May 15, 2020, Elbonia.

3rd Generation Partnership Project; Technical Specification Group Services and System Aspects; Study on system enhancement for Proximity based Services (ProSe) in the 5G System (5GS) (Release 17), 3GPP TR 23.752 V0.3.0, Jan. 27, 2020, Valbonne, France.

3rd Generation Partnership Project; Technical Specification Group Services and System Aspects; Procedures for the 5G System (5GS); Stage 2 (Release 16), 3GPP TS 23.502 V16.4.0, Mar. 27, 2020, Valbonne, France.

International Search Report dated Aug. 13, 2021, issued in International Application No. PCT/KR2021/006136.

Huawei et al., Open issues of Solution #6, 3GPP Draft, S2-2000493, SA WG2 Meeting #136AH, Jan. 7, 2020, XP051842558.

3rd Generation Partnership Project; Technical Specification Group Services and System Aspects; Study on system enhancement for Proximity based Services (ProSe) in the 5G System (5GS) (Release 17), 3GPP TR 23.752 V17.0.0, Mar. 31, 2021, pp. 1-183, XP052000261.

Samsung, Update to Solution #6: Layer-3 UE-to-Network Relay, 3GPP SA WG2 #136-AH, S2-2000870, Jan. 7, 2020.

3GPP, 3rd Generation Partnership Project; Technical Specification Group Services and System Aspects; Architecture enhancements for 5G System (5GS) to support Vehicle-to-Everything (V2X) services (Release 16), 3GPP TS 23.287 V16.2.0 (Mar. 2020), Mar. 27, 2020.

Samsung, Harq enhancements for NR-U, 3GPP TSG RAN WG1 #96, R1-1902259, Feb. 15, 2019.

Nokia Networks, ProSe Priorities in the ProSe UE-to-Network Relay scenario, 3GPP TSG-SA WG2#110, S2-152248, Jun. 30, 2015.

Extended European Search Report dated Sep. 8, 2023, issued in European Patent Application No. 21807853.3.

United Kingdom Office Action dated Oct. 21, 2021, issued in United Kingdom Patent Application No. GB2106639.4.

Japanese Office Action dated Oct. 3, 2023, issued in Japanese Patent Application No. 2022-571199.

* cited by examiner

METHOD AND APPARATUS FOR QUALITY OF SERVICE HANDLING IN WIRELESS COMMUNICATION SYSTEM

CROSS-REFERENCE TO RELATED APPLICATION(S)

This application is a continuation application of prior application Ser. No. 17/323,401, filed on May 18, 2021, which will be issued as U.S. Pat. No. 11,647,416 on May 9, 2023, and is based on and claims priority under 35 U.S.C § 119(a) of a Great Britain patent application number 2007435.7, filed on May 19, 2020, in the Great Britain Intellectual Property Office, and of a Great Britain patent application number 2106639.4, filed on May 10, 2021, in the Great Britain Intellectual Property Office, the disclosure of each of which is incorporated by reference herein in its entirety.

BACKGROUND

1. Field

The disclosure relates to the quality of service (QoS) handling for proximity services (ProSe) where a user equipment (UE)-to-Network Relay entity provides the functionality to support connectivity to the network for Remote UEs.

2. Description of Related Art

To meet the demand for wireless data traffic having increased since deployment of $4^{th}$ generation (4G) communication systems, efforts have been made to develop an improved $5^{th}$ generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for easily providing various services according to the development of a wireless communication system.

Additional aspects will be set forth in part in the description which follows and, in part, will be apparent from the description, or may be learned by practice of the presented embodiments.

In accordance with an aspect of the disclosure, a method performed by a user equipment (UE)-to-network relay in a wireless communication system is provided. The method includes, in case that PC5 quality of service (QoS) flows setup is initiated by a remote UE, identifying whether QoS requirements associated with the remote UE and the UE-to-network relay are supported, in case that the QoS requirements are not supported, identifying one or more QoS parameters that satisfy the QoS requirements, and based on the one or more QoS parameters, updating a PC5 QoS flow.

In accordance with another aspect of the disclosure, a method performed by a user equipment (UE)-to-network relay in a wireless communication system is provided. The method includes transmitting, to a policy control function (PCF) via a session management function (SMF), information associated with at least one quality of service (QoS) requirement, receiving, from the PCF via the SMF, one or more PC5 QoS parameters, and initiating a layer-2 link modification procedure based on the one or more PC5 QoS parameters.

In accordance with another aspect of the disclosure, a user equipment (UE)-to-network relay in a wireless communication system is provided. The UE-to-network relay includes a transceiver, and at least one processor configured to, in case that PC5 quality of service (QoS) flows setup is initiated by a remote UE, identify whether QoS requirements associated with the remote UE and the UE-to-network relay are supported, in case that the QoS requirements are not supported, identify one or more QoS parameters that satisfy the QoS requirements, and based on the one or more QoS parameters, update a PC5 QoS flow.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures

DETAILED DESCRIPTION

Figure 1:
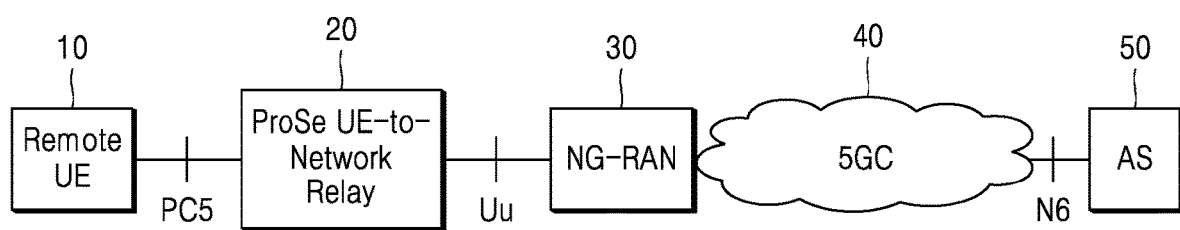
FIG. 1 illustrates a traffic relay system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described with reference to accompanying drawings. In the following descriptions, well-known functions or configurations are not described because they would obscure the disclosure with unnecessary details. The terms used in the specification are defined based on functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. In addition, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element, such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. In addition, in an embodiment of the disclosure, the "unit" may include at least one processor. In the following descriptions of the disclosure, well-known functions or configurations are not described because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. For example, a base station (BS) described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. For example, a base station explained as an eNB may also indicate a gNB. The term UE may also indicate a mobile phone, NB-IoT devices, sensors, and other wireless communication devices.

Proximity Services (ProSe) (specifically the direct communication) have been enhanced to support vehicle to everything (V2X) services over LTE. For Fifth Generation Systems (5GS), the proximity services are expected to be an important system-wide enabler to support various applications and services.

Another class of commercial services has recently emerged known as Network-controlled Interactive services (NCIS) that share some commonality of requirements with public safety services and applications. NCIS refers to a kind of service which needs at least 2 user equipment (UE) to join and share data, e.g., interactive gaming or data sharing. Those UEs in the same NCIS session are grouped together as one NCIS group, and the group is determined by application layer (i.e., NCIS application server).

In order to guarantee service requirements, QoS parameters are derived based on proximity application requirements; QoS flows and corresponding QoS rules are created accordingly. However, in the presence of a relay, this is not trivial and involves performing QoS control for PC5 interface between Remote UE and UE-to-Network Relay as well as QoS control over protocol data unit (PDU) session established between the UE-to-Network Relay and the Network via Uu interface.

FIG. 1 shows an example of how ProSe UE-to-Network Relay 20 relays traffic (uplink (UL) and downlink (DL)) between the Remote UE 10 and the Network (comprising NG-Radio Access Network (RAN) 30, 5G Core (5GC) 40, and Application Server (AS) 50).

The terms ProSe UE-to-Network Relay and UE-to-Network Relay or, simply, relay are used interchangeably throughout the disclosure, as will be understood by the skilled person.

Embodiments of the disclosure aim to address shortcomings in the prior art, whether mentioned herein or not.

According to a first aspect of the disclosure, there is provided a method of managing Quality of Service, QoS, in a telecommunication system comprising a user equipment (UE), which is operable to communicate with a network via a UE to network relay, wherein the QoS is managed in response to at least one trigger derived from one or more of a remote UE, a ProSe UE to network Relay, radio access network (RAN), and an application server.

In an embodiment of the disclosure, the at least one trigger is based on, or derived from, one or more of link status between a remote UE and a ProSe UE-to-network relay, Uu Congestion status or other indications on QoS fulfilment from RAN, and policy controls derived from Application Sever, either for public safety applications or for network-controlled interactive services (NCIS).

In an embodiment of the disclosure, the QoS management is in response to a trigger from either the remote UE or ProSe UE to network Relay over a PC5 interface.

In an embodiment of the disclosure, a QoS mapping configuration is preconfigured on one or more of the UE and ProSe UE to network Relay or is provisioned by a user configuration Update via PCF.

In an embodiment of the disclosure, the QoS mapping configuration indicates how Uu-level QoS flows are mapped to PC5 QoS flows and/or vice-versa.

In an embodiment of the disclosure, an entry in the QoS mapping configuration includes an adjustment factor to be applied per individual QoS characteristics when mapping is performed.

In an embodiment of the disclosure, if there is a degradation in a channel state, either the UE or ProSe UE to network Relay identifies that QoS requirements over the link between the UE and ProSe UE to network Relay cannot be met, reflecting that end-to-end QoS requirements cannot be met.

In an embodiment of the disclosure, the ProSe UE to network Relay initiates a remote UE report to SMF including Remote User ID, IP information or any other relevant address information, indicating the highest priority Alternative QoS profile that can be fulfilled, meeting end-end QoS requirements.

In an embodiment of the disclosure, the UE or ProSe UE to network Relay uses Layer-2 link modification procedure to modify PC5 QoS flow in line with the Alternative QoS Profile adopted.

In an embodiment of the disclosure, as part of the Layer-2 link modification procedure, PC5 QoS rules are updated with additional information elements either implicitly or explicitly, reflecting a change in the end-to-end QoS requirements.

In an embodiment of the disclosure, the SMF forwards the remote UE report to PCF.

In an embodiment of the disclosure, the SMF initiates a transparent network access stratum (NAS) update towards RAN to amend Uu-level QoS flows treatment between RAN and a ProSe UE-to-Network relay or to change PC5-level cap on link transmission based on new ProSe configuration and policy parameters or Alternative QoS profile over PC5.

In an embodiment of the disclosure, on ProSe AF request, a UE or a ProSe UE to network Relay receives a user configuration update from PCF (80) to notify new ProSe configuration and policy parameters.

In an embodiment of the disclosure, either a ProSe UE to network Relay establishes a new PDU session or modifies an existing PDU session for relaying; or PCF initiates a PDU session modification.

According to a second aspect of the disclosure, there is provided apparatus arranged to perform the method of the first aspect.

Although a few preferred embodiments of the disclosure have been shown and described, it will be appreciated by those skilled in the art that various changes and modifications might be made without departing from the scope of the disclosure, as defined in the appended claims.

For a better understanding of the disclosure, and to show how embodiments of the same may be carried into effect, reference will now be made, by way of example only, to the accompanying diagrammatic drawings in which:

FIG. 1 illustrates a traffic relay system according to an embodiment of the disclosure.

Figure 2:
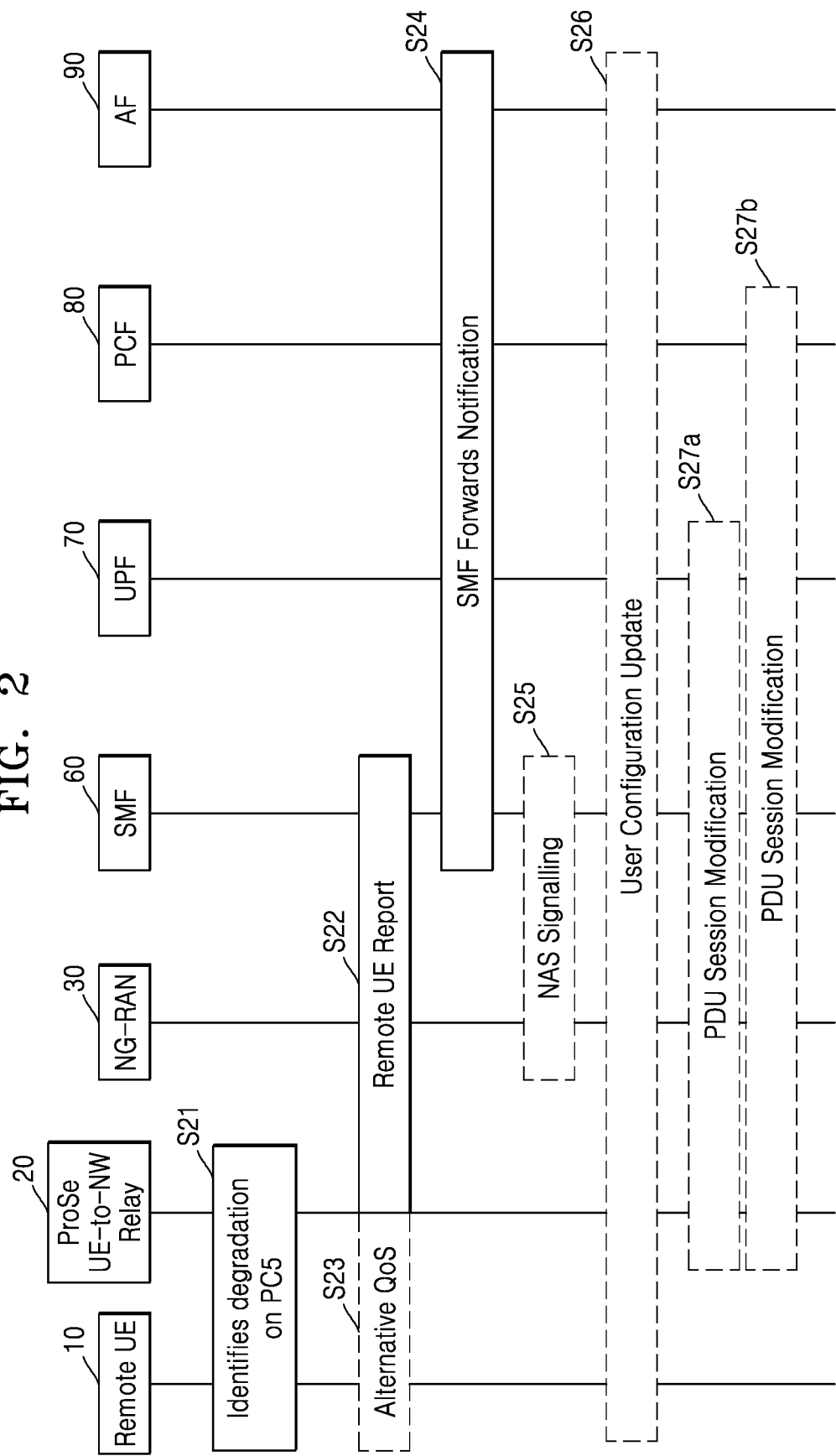
FIG. 2 illustrates a representation of a call flow according to an embodiment of the disclosure.

FIG. 2 illustrates a representation of a call flow according to an embodiment of the disclosure.

Figure 3:
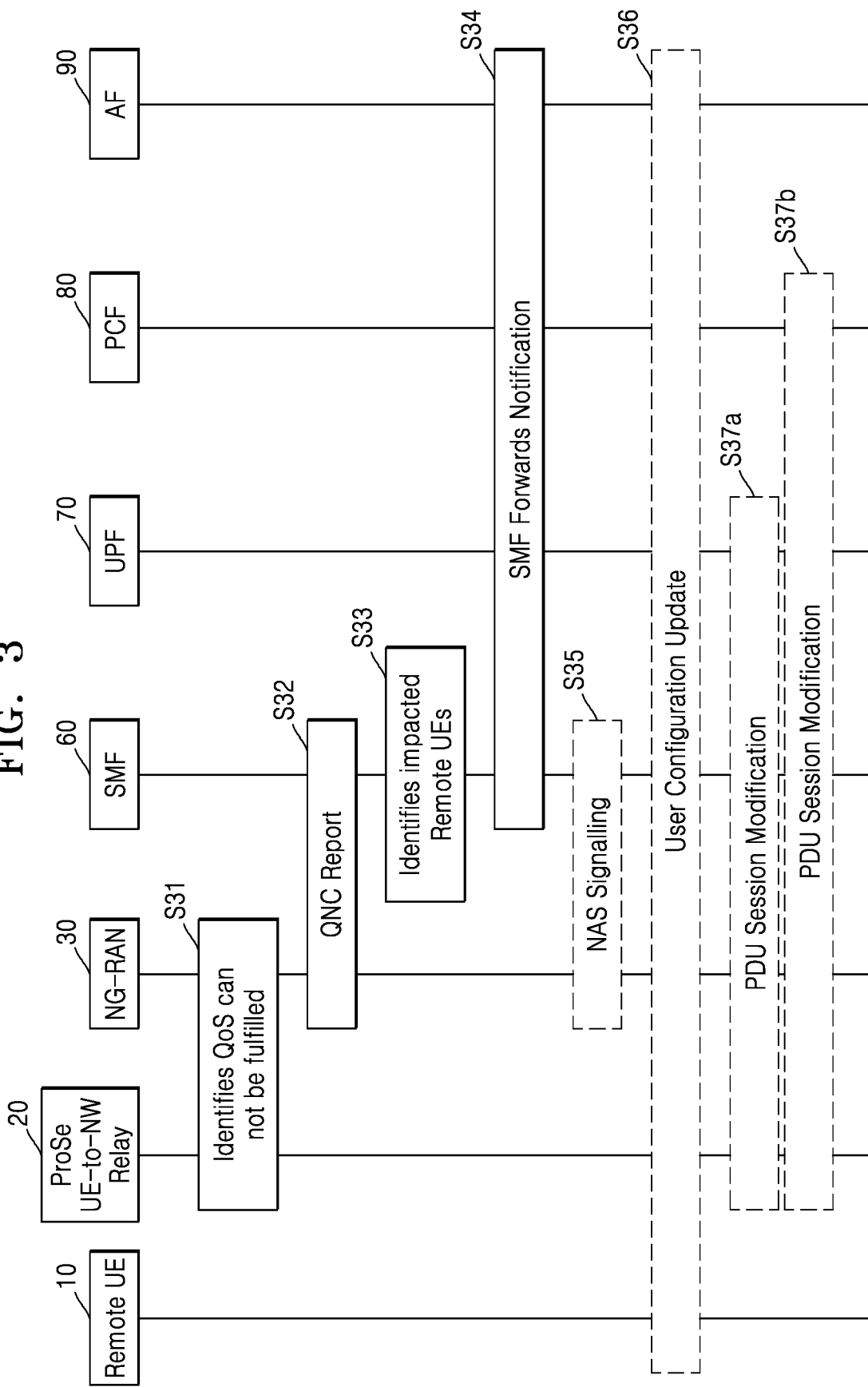
FIG. 3 illustrates a representation of a call flow according to an embodiment of the disclosure.

FIG. 3 illustrates a representation of a call flow according to an embodiment of the disclosure.

Figure 4:
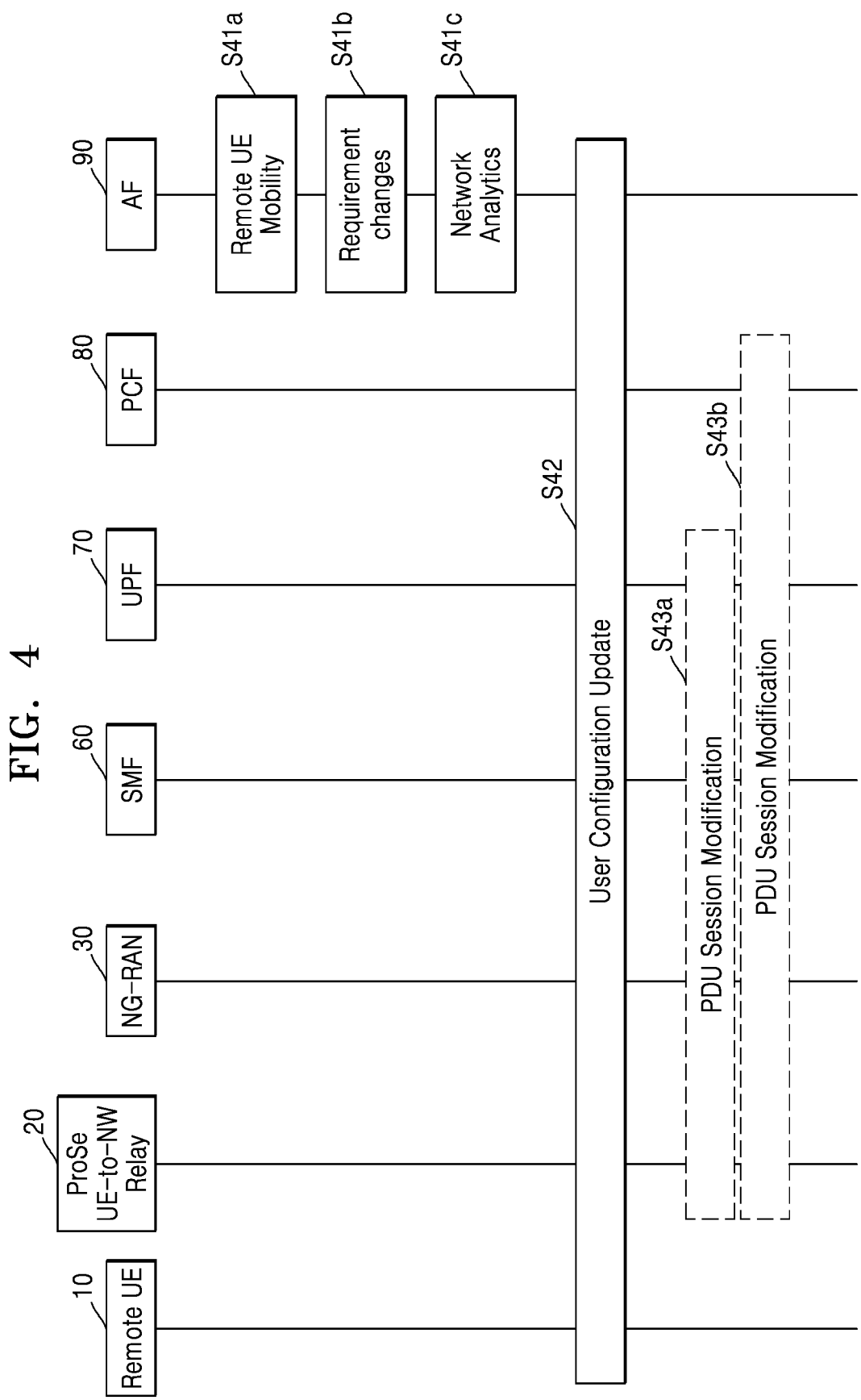
FIG. 4 illustrates a representation of a call flow according to an embodiment of the disclosure.

FIG. 4 illustrates a representation of a call flow according to an embodiment of the disclosure.

FIG. 2, and the following figures, show various network functions and/or entities, whose functions and definitions are known in the art in at least: 3GPP TS 23.501, 3GPP TS 23.502 and 3GPP TS 23.503. The various known functions of these network functions/entities are varied and/or enhanced as set out in the following description.

For completeness, the various functions/entities shown are: a user equipment (UE) (10), a next generation radio access network (NG-RAN) (30), a session management function (SMF) (60), a user policy function (UPF) (70), a policy control function (PCF) (80), and an application function (AF) (90).

Referring to FIG. 2, SMF (60), UPF (70), PCF (80) are constituent parts of 5GC (40). AF (90) is equivalent to AS (50).

Unless explicitly indicated, PCF 80 refers to the policy control function utilized for UE policy and access and mobility (AM) policy association. Otherwise, when stated (session management (SM) Policy) PCF 80 refers to the policy control function utilized for SM policy association. Both policy functions may be co-located dependent on the deployment and the selection criteria.

FIG. 2 illustrates a first scenario according to an embodiment of the disclosure. This embodiment relates to QoS control based on a trigger from Remote UE/ProSe UE-to-Network Relay over the PC5 Interface. In this scenario, it is assumed that ProSe configuration and policy parameters including QoS mapping configuration have been pre-configured on the Remote UE 10 (and UE-to-Network Relay 20) or provisioned by User Configuration Update via PCF 80 e.g., based on ProSe AF request. A QoS mapping table indicates how Uu-level QoS flows (i.e., 5G QoS Identifiers—5QIs) can be mapped to PC5 QoS flows (i.e., PC5 QoS Identifiers—PQIs) or vice versa. Each entry in the table may also include an adjustment factor to be applied per individual QoS characteristics (e.g., packet delay budget) within 5QIs and/or PQIs when mapping 5QIs to PQIs or vice versa.

Details of each operation shown in FIG. 2 are:

S21. Due to degradation in the channel state, based on L1/L2 measurements or other indications on PC5-U/PC5-S (e.g., due to a change of service, resulting in a new end-to-end QoS requirement), either Remote UE 10 or UE-to-network relay 20 identifies that the QoS requirements over PC5 cannot be fulfilled anymore.

For example, in operation S21, the UE 10 or UE-to-network relay 20 may identify that the QoS requirements over PC5 are not supported. In an embodiment of the disclosure, the UE 10 may identify that QoS requirements over PC5 are not supported and transmit, to the UE-to-network relay, information associated with at least one QoS requirement. The information associated with the at least one QoS requirements may indicate that the QoS requirements over PC5 are not supported.

S22. UE-to-Network Relay 20 may initiate a Remote UE report to SMF 60 (e.g., via NG-RAN 30) including Remote User ID, IP information or any other relevant information, indicating that the QoS profile cannot be fulfilled. A further Remote UE report to SMF 60 can be initiated in case the QoS profile can be fulfilled again in future.

For example, in operation S22, the UE-to-Network Relay 20 may transmit, to the SMF, the information associated with the at least one QoS requirements indicating that the QoS requirements over PC5 are not supported. In an embodiment of the disclosure, the information associated with the at least one QoS requirements may be transmitted from the UE-to-Network Relay 20 to the SMF 60 via Remote UE report.

S23. [Conditional in support of an Alternative QoS over PC5, or depending on the implementation] UE-to-Network Relay 20 may initiate a Remote UE report to SMF 60 (e.g., via NG-RAN 30) including Remote User ID, IP information or any other relevant address information, indicating the highest priority Alternative QoS profile that can be fulfilled meeting end-to-end QoS requirements. Remote UE 10 (and/or UE-to-Network Relay 20) may use Layer-2 link modification procedure to modify PC5 QoS flow(s) in line with the Alternative QoS Profile adopted. If no Alternative QoS profile matches the current channel state, the procedure would be similar to operation S22, described above.

In an embodiment of the disclosure, the UE-to-Network Relay 20 may identify one or more QoS parameters that satisfy the QoS requirements and transmit, to the PCF 80 via the SMF 60, information associated with the one or more QoS parameters. Based on an authorization of the one or more QoS parameters performed by the PCF 80, the UE-to-Network Relay 20 may update a PC5 QoS flow via the Layer-2 link modification procedure.

As part of Layer-2 link modification to PC5 QoS flow(s), the PC5 QoS rules can be updated with additional information elements either implicitly or explicitly (to be stored as part of UE PC5 QoS context), reflecting change in end-to-end QoS requirements e.g., updated PQI/5QI, updated adjustment factor per QoS characteristics within PQI/5QI, updated end-to-end Packet delay budget, updated priority level, updated packet error rate, updated averaging window, updated maximum data burst volume or any other PC5 QoS characteristics. Such additional information may override the default QoS characteristics.

S24. SMF 60 may forward the notification to (SM Policy) PCF 80. ProSe AF 90 may also be notified based on a former subscription to (SM Policy) PCF 80. ProSe AF 90 may update the relevant ProSe configuration and policy parameters.

In an embodiment of the disclosure, the PCF 80 may identify one or more PC5 QoS parameters and transmit, to the UE-to-Network Relay 20 via the SMF 60, information associated with the one or more PC5 QoS parameters.

S25. Unless notified differently by (SM Policy) PCF 80, SMF 60 may initiate a transparent network access stratum (NAS) update towards NG-RAN 30, e.g., to amend Uu-level QoS flows treatment between NG-RAN 30 and UE-to-Network Relay 20 (e.g., to update packet delay budget) or to change PC5-level cap on link transmission based on new ProSe configuration and policy parameters or alternative QoS profile over PC5 (if supported, or depending on the implementation).

S26. On ProSe AF request, a remote UE 10 (and/or UE-to-Network Relay 20) may receive a user configuration update (via PCF 80) to notify on new ProSe configuration and policy parameters. Remote UE 10 (and/or UE-to-Network Relay 20) may use Layer-2 link modification procedure to modify PC5 QoS flow(s) in line with Configuration Update.

In an embodiment of the disclosure, in operation S26, the UE-to-Network Relay 20 may initiate the Layer-2 link modification procedure based on the one or more PC5 QoS parameters. For example, the UE-to-Network Relay 20 may update PC5 QoS flows via the Layer-2 link modification procedure.

S27. (a) UE-to-Network Relay 20 may establish a new PDU session or modify an existing PDU session for relaying. (b) Alternatively, PCF 80 may initiate PDU session modification.

FIG. 3 illustrates a second scenario according to an embodiment of the disclosure. This embodiment relates to a Network-Assisted QoS control over Uu interface. In this scenario, it is assumed that ProSe configuration and policy parameters including QoS mapping configuration have been pre-configured on Remote UE 10 (and UE-to-Network Relay 20) or provisioned by user configuration update via PCF 80 e.g., based on ProSe AF request. It is also assumed that Remote User ID is already registered in SMF 60 via a Remote UE report.

Details of each operation in FIG. 3 are:

S31. NG-RAN 30 may detect that QoS requirements cannot be fulfilled for one or more QoS Flows (towards UE-to-Network Relay 20 via Uu interface).

S32. NG-RAN 30 may initiate a QoS notification (QNC) to SMF 60. (If an Alternative QoS can be supported over Uu), the highest priority Alternative QoS profile can be indicated.

S33. Based on Remote User ID(s) implicated by this QNC, SMF 60 may identify that ProSe configuration parameters or QoS Profile (e.g., over PC5) should be changed.

S34. SMF 60 may forward the QoS notification to (SM Policy) PCF 80. ProSe AF 90 may also be notified based on a former subscription to (SM Policy) PCF 80 to update relevant ProSe configuration and policy parameters.

S35. Unless notified differently by (SM Policy) PCF 80, SMF 60 may initiate a transparent NAS update towards NG-RAN 30, e.g., to amend Uu-level QoS flows treatment between NG-RAN 30 and UE-to-Network Relay 20 (e.g., to update Packet Delay Budget) or to change PC5-level cap on link transmission based on new ProSe configuration and policy parameters or an Alternative QoS profile adopted over Uu (if supported).

S36. On ProSe AF 90 request, Remote UE 10 (and/or UE-to-Network Relay 20) may receive a user configuration update (via PCF 80) to notify on new ProSe configuration and policy parameters. Remote UE 10 (and/or UE-to-Network Relay 20) may use Layer-2 link modification procedure to modify PC5 QoS flow(s).

S37. (a) UE-to-Network Relay 20 may establish a new PDU session or modify an existing PDU session for relaying. (b) Alternatively PCF 80 may initiate PDU session modification.

FIG. 4 illustrates a third scenario according to an embodiment of the disclosure. This embodiment relates to an AF-assisted QoS control. It is assumed that ProSe configuration and policy parameters including QoS mapping configuration have been pre-configured on Remote UE 10 (and UE-to-Network Relay 20) or provisioned by User Configuration Update via PCF 80 e.g., based on ProSe AF request. Furthermore, ProSe AF 90 may access analytics data from NWDAF 100 (not shown).

Details of each operation in FIG. 4 are:

S41. ProSe AF 90 may identify that all QoS requirements cannot be fulfilled for one or more QoS Flows e.g., based on (a) Remote UE mobility, (b) topology or requirement changes or (c) any analytics notification (either as statistics or prediction) from NWDAF 100 (e.g., on QoS sustainability or service experience).

S42. On ProSe AF 90 request, Remote UE 10 (and/or UE-to-Network Relay 20) may receive a User Configuration Update (via PCF 80) to notify on new ProSe configuration and policy parameters or an alternative QoS profile to use over PC5 (if supported or depending on the implementation). Remote UE 10 (and/or UE-to-Network Relay 20) may use Layer-2 link modification procedure to modify PC5 QoS flow(s).

S43. (a) UE-to-Network Relay 20 may establish a new PDU session or modify an existing PDU session for relaying. (b) Alternatively PCF 80 may initiate PDU session modification.

Figure 5:
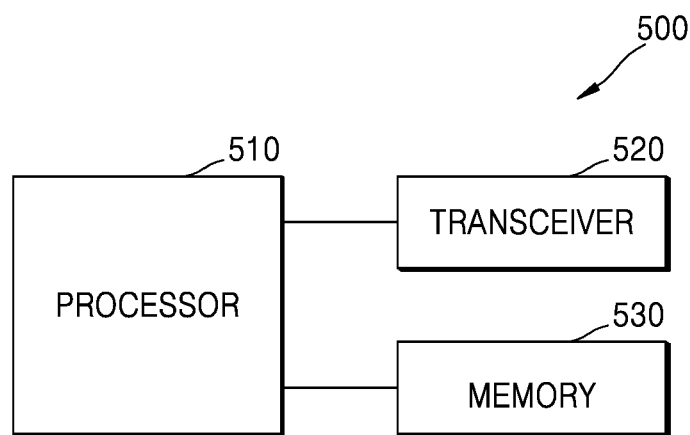
FIG. 5 is a diagram illustrating UE-to network relay according to an embodiment of the disclosure.

FIG. 5 is a diagram illustrating UE-to-network relay according to an embodiment of the disclosure.

Referring to the FIG. 5, the UE-to-network relay 500 may include a processor 510, a transceiver 520 and a memory 530. However, all of the illustrated components are not essential. The UE-to-network relay 500 may be implemented by more or less components than those illustrated in the FIG. 5. In addition, the processor 510 and the transceiver 520 and the memory 530 may be implemented as a single chip according to another embodiment.

The aforementioned components will now be described.

The processor 510 may include one or more processors or other processing devices that control the proposed function, process, and/or method. Operation of the UE-to-network relay 500 may be implemented by the processor 610.

The transceiver 520 may be connected to the processor 510 and transmit and/or receive a signal. In addition, the transceiver 520 may receive the signal through a wireless channel and output the signal to the processor 510. The transceiver 520 may transmit the signal output from the processor 510 through the wireless channel.

The memory 530 may store the control information or the data included in a signal obtained by the UE-to-network relay 500. The memory 530 may be connected to the processor 510 and store at least one instruction or a protocol or a parameter for the proposed function, process, and/or method. The memory 530 may include a read-only memory (ROM) and/or a random access memory (RAM) and/or hard disk and/or a compact disc read only memory (CD-ROM) and/or a digital versatile disc (DVD) and/or other storage devices.

Figure 6:
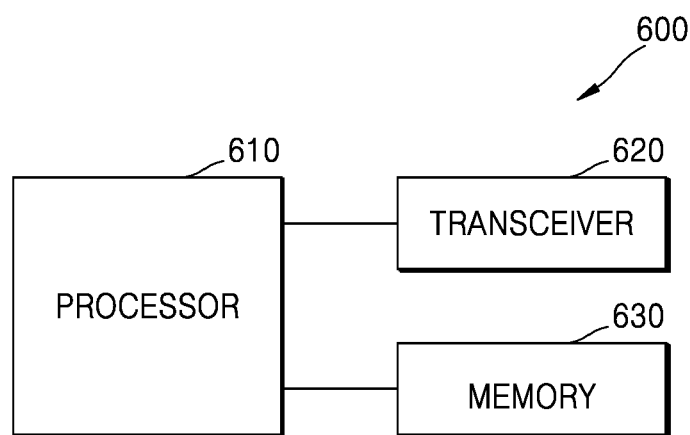
FIG. 6 is a diagram illustrating a user equipment according to an embodiment of the disclosure.

FIG. 6 is a diagram illustrating a user equipment according to an embodiment of the disclosure.

Referring to the FIG. 6, the UE 600 may include a processor 610, a transceiver 620 and a memory 630. However, all of the illustrated components are not essential. The UE 600 may be implemented by more or less components than those illustrated in the FIG. 6. In addition, the processor 610 and the transceiver 620 and the memory 630 may be implemented as a single chip according to another embodiment.

The aforementioned components will now be described.

The processor 610 may include one or more processors or other processing devices that control the proposed function, process, and/or method. Operation of the UE 600 may be implemented by the processor 610.

The transceiver 620 may be connected to the processor 610 and transmit and/or receive a signal. In addition, the transceiver 620 may receive the signal through a wireless channel and output the signal to the processor 610. The transceiver 620 may transmit the signal output from the processor 610 through the wireless channel.

The memory 630 may store the control information or the data included in a signal obtained by the UE 600. The memory 630 may be connected to the processor 610 and store at least one instruction or a protocol or a parameter for the proposed function, process, and/or method. The memory 630 may include a read-only memory (ROM) and/or a random access memory (RAM) and/or a hard disk and/or a CD-ROM and/or a DVD and/or other storage devices.

Figure 7:
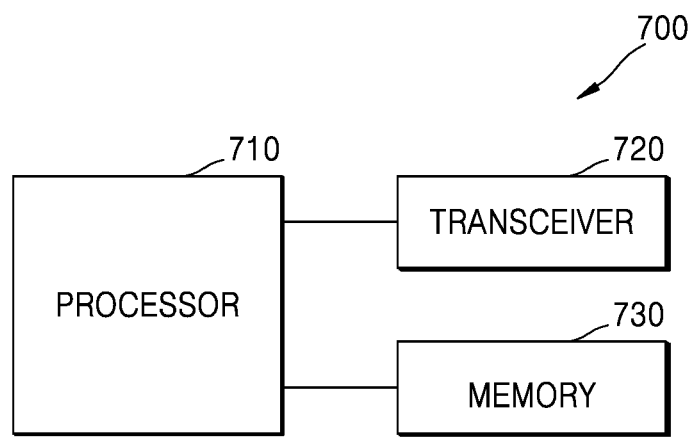
FIG. 7 is a diagram illustrating a core network entity according to an embodiment of the disclosure.

FIG. 7 is a diagram illustrating a core network entity according to an embodiment of the disclosure.

The NG-RAN 30, 5GC 40 and application server 50 described above may correspond to the core network entity 700.

Referring to the FIG. 7, the core network entity 700 may include a processor 710, a transceiver 720 and a memory 730. However, all of the illustrated components are not essential. The core network entity 700 may be implemented by more or less components than those illustrated in FIG. 7. In addition, the processor 710 and the transceiver 720 and the memory 730 may be implemented as a single chip according to another embodiment.

The aforementioned components will now be described.

The transceiver 720 may provide an interface for performing communication with other devices in a network. For example, the transceiver 720 may convert a bitstream transmitted from the core network entity 700 to other devices to a physical signal and covert a physical signal received from other devices to a bitstream. For example, the transceiver 720 may transmit and receive a signal. The transceiver 720 may be referred to as modem, transmitter, receiver, communication unit and communication module. The transceiver 720 may enable the core network entity 700 to communicate with other devices or system through backhaul connection or other connection method.

The memory 730 may store a basic program, an application program, configuration information for an operation of the core network entity 700. The memory 730 may include volatile memory, non-volatile memory and a combination of the volatile memory and the non-volatile memory. The memory 730 may provide data according to a request from the processor 710.

The processor 710 may control overall operations of the core network entity 400. For example, the processor 710 may transmit and receive a signal through the transceiver 720. The processor 710 may include at least one processor. The processor 710 may control the core network entity 700 to perform operations according to embodiments of the disclosure.

In accordance with an embodiment of the disclosure, a method of managing quality of service (QoS) in a telecommunication system is provided. The method may comprise a user equipment (UE) (10), which is operable to communicate with a network via a UE to network relay (20), wherein the QoS is managed in response to at least one trigger derived from one or more of a) a remote UE (10), b) a ProSe UE to network relay (20), c) a radio access network (RAN) (30), and d) an application server (50).

In an embodiment of the disclosure, wherein the at least one trigger is based on, or derived from, one or more of a) a link status between remote UE (10) and a ProSe UE-to-network relay (20), b) Uu Congestion status or other indications on QoS fulfilment from RAN (30), and c) Policy controls derived from an application server (50), either for public safety applications or for network-controlled interactive services, NCIS.

In an embodiment of the disclosure, wherein the QoS management is in response to a trigger from either the remote UE (10) or ProSe UE to network relay (20) over a PC5 interface.

In an embodiment of the disclosure, wherein a QoS mapping configuration is preconfigured on one or more of the UE (10) and ProSe UE to network Relay (20) or is provisioned by a user configuration update via PCF (80).

In an embodiment of the disclosure, wherein the QoS mapping configuration indicates how Uu-level QoS flows are mapped to PC5 QoS flows and/or vice-versa.

In an embodiment of the disclosure, wherein an entry in the QoS mapping configuration includes an adjustment factor to be applied per individual QoS characteristics when mapping is performed.

In an embodiment of the disclosure, wherein, if there is a degradation in a channel state, either the UE (10) or ProSe UE to network Relay (20) identifies that QoS requirements over the link between the UE (10) and ProSe UE to network Relay (20) cannot be met, reflecting that end-to-end QoS requirements cannot be met.

In an embodiment of the disclosure, wherein the ProSe UE to network Relay (20) initiates a remote UE report to SMF (60) including Remote User ID, IP information or any other relevant address information, indicating the highest priority Alternative QoS profile that can be fulfilled, meeting end-end QoS requirements.

In an embodiment of the disclosure, wherein the UE (10) or ProSe UE to network Relay (20) uses Layer-2 link modification procedure to modify PC5 QoS flow in line with the Alternative QoS Profile adopted.

In an embodiment of the disclosure, wherein as part of the Layer-2 link modification procedure, PC5 QoS rules are updated with additional information elements either implicitly or explicitly, reflecting a change in the end-to-end QoS requirements.

In an embodiment of the disclosure, wherein the SMF (60) forwards the remote UE report to PCF (80).

In an embodiment of the disclosure, wherein the SMF (60) initiates a transparent network access stratum (NAS), update towards RAN (30) to amend Uu-level QoS flows treatment between RAN (30) and ProSe UE-to-network relay (20) or to change PC5-level cap on link transmission based on new ProSe configuration and policy parameters or Alternative QoS profile over PC5.

In an embodiment of the disclosure, wherein on ProSe AF (90) request, UE (10) or ProSe UE to network Relay (20) receives a user configuration update from PCF (80) to notify new ProSe configuration and policy parameters.

In an embodiment of the disclosure, wherein either: ProSe UE to network relay (20) establishes a new PDU session or modifies an existing PDU session for relaying, or a PCF (80) initiates a PDU session modification.

In an embodiment of the disclosure, apparatus is arranged to perform the method.

In accordance with an embodiment of the disclosure, a method performed by a user equipment (UE)-to-network relay in a wireless communication system is provided. The method may comprise in case that PC5 quality of service (QoS) flows setup is initiated by a remote UE, identifying whether QoS requirements associated with the remote UE and the UE-to-network relay are supported, in case that the QoS requirements are not supported, identifying one or more QoS parameters that satisfy the QoS requirements, and based on the one or more QoS parameters, updating a PC5 QoS flow.

In an embodiment of the disclosure, the method may further comprise transmitting, to a policy control function (PCF), information associated with the one or more QoS parameters.

In an embodiment of the disclosure, the updating of the PC5 QoS flow may comprises: updating the PC5 QoS flow based on an authentication of the one or more QoS parameters.

In an embodiment of the disclosure, the method may further comprise receiving, from a PCF, information associated with QoS mapping rules.

In an embodiment of the disclosure, wherein information associated with QoS mapping rules for the UE-to-network relay is pre-configured.

In an embodiment of the disclosure, wherein the PC5 QoS flow is updated via a layer-2 link modification procedure.

In accordance with an embodiment of the disclosure, a method performed by a user equipment (UE)-to-network relay in a wireless communication system is provided. The method may comprise transmitting, to a policy control function (PCF) via a session management function (SMF), information associated with at least one quality of service (QoS) requirement, receiving, from the PCF via the SMF, one or more PC5 QoS parameters, and initiating a layer-2 link modification procedure based on the one or more PC5 QoS parameters.

In an embodiment of the disclosure, wherein the information associated with the at least one quality of service (QoS) requirement is received from a remote UE.

In an embodiment of the disclosure, wherein the information associated with the at least one quality of service (QoS) requirement is transmitted to the SMF via a remote UE report.

In an embodiment of the disclosure, wherein the layer-2 link modification is used to update PC5 QoS flows.

In an embodiment of the disclosure, wherein a QoS flow setup is initiated by the SMF.

In accordance with an embodiment of the disclosure, a user equipment (UE)-to-network relay in a wireless communication system is provided. The UE-to-network relay may comprise: a transceiver, and at least one processor configured to in case that PC5 quality of service (QoS) flows setup is initiated by a remote UE, identify whether QoS requirements associated with the remote UE and the UE-to-network relay are supported, in case that the QoS requirements are not supported, identify one or more QoS parameters that satisfy the QoS requirements, and based on the one or more QoS parameters, update a PC5 QoS flow.

In an embodiment of the disclosure, the at least one processor is further configured to transmit, to a policy control function (PCF) via the transceiver, information associated with the one or more QoS parameters.

In an embodiment of the disclosure, the at least one processor is further configured to update the PC5 QoS flow based on an authentication of the one or more QoS parameters.

In an embodiment of the disclosure, the at least one processor is further configured to receive, from a PCF via the transceiver, information associated with QoS mapping rules.

Note that in all embodiments described above, based on new ProSe configuration and policy parameters, Remote UE 10 may alternatively decide to run a new discovery procedure to find another UE-to-Network Relay 20'. Remote UE 10 may use Layer-2 link modification procedure to remove PC5 QoS flow(s). If so, a Remote UE Report may be sent (e.g., via existing UE-to-Network Relay 20) to inform the SMF 60 that the Remote UE 10 is going to leave. Corresponding PDU session (of existing UE-to-Network Relay 20) can be modified or released dependent on implementation criteria.

Although presented in terms of ProSe and 5GC, the skilled person will readily appreciate that other network topologies and/or protocols which rely on direct communication between UEs and also network-assisted communication between the same devices will benefit from embodiments of the disclosure.

At least some of the example embodiments described herein may be constructed, partially or wholly, using dedicated special-purpose hardware. Terms, such as 'component', 'module' or 'unit' used herein may include, but are not limited to, a hardware device, such as circuitry in the form of discrete or integrated components, a field programmable gate array (FPGA) or application specific integrated Circuit (ASIC), which performs certain tasks or provides the associated functionality. In some embodiments of the disclosure, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment of the disclosure, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the operations of any method or process so disclosed, may be combined in any combination, except combinations where at least some of such features and/or operations are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE)-to-network relay in a wireless communication system, the method comprising:
    identifying information associated with a quality of service (QOS) mapping, wherein the information associated with the QoS mapping is pre-configured or received by the UE-to-network relay from a core network entity;
    identifying whether end-to-end QOS requirements are supported, based on the information associated with the QoS mapping;
    in case that the end-to-end QoS requirements are not supported, determining at least one QoS related parameter for a QoS control;
    transmitting, to a remote UE, information including the at least one QoS related parameter determined by the UE-to-network relay; and
    transmitting, to a base station, information associated with the at least one QoS related parameter determined by the UE-to-network relay.

2. The method of claim 1,
    wherein the information associated with the at least one QoS related parameter is transmitted to the core network entity.

3. The method of claim 2, further comprising:
    updating a PC5 QoS flow based on information associated with a policy control function (PCF) entity.

4. The method of claim 1, wherein the information including the at least one QoS related parameter is transmitted via a layer-2 link modification procedure for modifying a PC5 QoS flow.

5. A user equipment (UE)-to-network relay in a wireless communication system, the UE-to-network relay comprising:
    a transceiver; and
    at least one processor configured to:
        identify information associated with a quality of service (QOS) mapping, wherein the information associated with the QoS mapping is pre-configured or received by the UE-to-network relay from a core network entity,
        identify whether end-to-end QOS requirements are supported, based on the information associated with the QoS mapping,
        in case that the end-to-end QoS requirements are not supported, determine at least one QoS related parameter for a QoS control,
        transmit, to a remote UE via the transceiver, information including the at least one QoS related parameter determined by the UE-to-network relay, and
        transmit, to a base station via the transceiver, information associated with the at least one QoS related parameter determined by the UE-to-network relay.

6. The UE-to-network relay of claim 5,
    wherein the information associated with the at least one QoS related parameter is transmitted to the core network entity.

7. The UE-to-network relay of claim 6, wherein the at least one processor is configured to update a PC5 QOS flow based on information associated with a policy control function (PCF) entity.

8. The UE-to-network relay of claim 5, wherein the information including the at least one QoS related parameter is transmitted via a layer-2 link modification procedure for modifying a PC5 QoS flow.

* * * * *

UNITED STATES PATENT AND TRADEMARK OFFICE
CERTIFICATE OF CORRECTION

PATENT NO. : 12,108,277 B2
APPLICATION NO. : 18/312216
DATED : October 1, 2024
INVENTOR(S) : Mehrdad Shariat Page 1 of 1

It is certified that error appears in the above-identified patent and that said Letters Patent is hereby corrected as shown below:

In the Claims

1. Claim 1, Column 15, Line 50, "including the" should read -- including at least one of the --

2. Claim 1, Column 16, Lines 1-2, "associated with the at least one" should read -- associated with at least one of the at least one --

3. Claim 5, Column 16, Line 34, "including the" should read -- including at least one of the --

4. Claim 5, Column 16, Line 37, "associated with the at least one" should read -- associated with at least one of the at least one --

Signed and Sealed this
First Day of July, 2025

Coke Morgan Stewart
*Acting Director of the United States Patent and Trademark Office*